United States Patent
Forcier (10) Patent No.: US 10,094,286 B2
(45) Date of Patent: Oct. 9, 2018

(54) GAS TURBINE ENGINE WITH LOWER BIFURCATION HEAT EXCHANGER

(71) Applicant: United Technologies Corporation, Hartford, CT (US)

(72) Inventor: Matthew J. Forcier, Rocky Hill, CT (US)

(73) Assignee: United Technologies Corporation, Farmington, CT (US)

( * ) Notice: Subject to any disclaimer, the term of this patent is extended or adjusted under 35 U.S.C. 154(b) by 582 days.

(21) Appl. No.: 14/647,844

(22) PCT Filed: Jan. 29, 2013

(86) PCT No.: PCT/US2013/023645
§ 371 (c)(1),
(2) Date: May 28, 2015

(87) PCT Pub. No.: WO2014/120125
PCT Pub. Date: Aug. 7, 2014

(65) Prior Publication Data
US 2015/0308339 A1    Oct. 29, 2015

(51) Int. Cl.
*F02C 7/141* (2006.01)
*F02C 7/14* (2006.01)
(Continued)

(52) U.S. Cl.
CPC .............. *F02C 7/141* (2013.01); *F01D 25/24* (2013.01); *F02C 7/14* (2013.01); *F02C 7/32* (2013.01);
(Continued)

(58) Field of Classification Search
CPC ...... F02C 7/04; F02C 7/12; F02C 7/14; F02C 7/141; F02C 7/18; F02C 7/32; F02C 6/08;
(Continued)

(56) References Cited

U.S. PATENT DOCUMENTS

| 600,210 A | 3/1898 | Schofield |
| 2,625,000 A | 1/1953 | Benbow |

(Continued)

FOREIGN PATENT DOCUMENTS

| EP | 0469827 A1 | 2/1992 |
| EP | 1876328 A2 | 1/2008 |

(Continued)

OTHER PUBLICATIONS

European Examination Report, for European Patent Application No. 13873259.9, dated Dec. 9, 2016, 7 pages.
(Continued)

*Primary Examiner* — Phutthiwat Wongwian
*Assistant Examiner* — Loren Edwards
(74) *Attorney, Agent, or Firm* — Kinney & Lange, P.A.

(57) ABSTRACT

A gas turbine engine includes a nacelle, a lower bifurcation structure, and a heat exchanger. The nacelle extends circumferentially around an engine core and defines a fan bypass duct that is substantially annular between an inner wall and an outer wall. The lower bifurcation structure extends between the inner wall and the outer wall, bifurcating the fan bypass duct. The lower bifurcation structure defines a bifurcation duct extending along a central axis of the lower bifurcation structure. A heat exchanger is positioned in the bifurcation duct.

16 Claims, 4 Drawing Sheets

(51) Int. Cl.
*F02K 3/115* (2006.01)
*F01D 25/24* (2006.01)
*F02C 7/32* (2006.01)

(52) U.S. Cl.
CPC .......... *F02K 3/115* (2013.01); *F05D 2230/72* (2013.01); *F05D 2260/213* (2013.01); *Y02T 50/675* (2013.01)

(58) Field of Classification Search
CPC .......... F01D 25/24; F02K 3/105; F02K 3/115; F02K 3/02; F02K 3/06; F05D 2230/72; F05D 2260/213
USPC ...... 60/204, 206, 39.83, 262, 266, 267, 782, 60/785
See application file for complete search history.

(56) References Cited

U.S. PATENT DOCUMENTS

| | | |
|---|---|---|
| 2,865,580 A | 12/1958 | Marshall |
| 3,080,716 A | 3/1963 | Cummings et al. |
| 3,541,794 A * | 11/1970 | Johnston ................ B64D 29/08 239/265.29 |
| 5,123,242 A | 6/1992 | Miller |
| 5,369,954 A | 12/1994 | Stuart |
| 5,438,823 A | 8/1995 | Loxley et al. |
| 5,987,877 A | 11/1999 | Steiner |
| 6,282,881 B1 | 9/2001 | Beutin et al. |
| 7,607,308 B2 | 10/2009 | Kraft et al. |
| 7,765,788 B2 | 8/2010 | Schwarz |
| 7,810,311 B2 | 10/2010 | Schwarz et al. |
| 8,161,726 B2 | 4/2012 | Schwarz |
| 2007/0245738 A1 | 10/2007 | Stretton et al. |
| 2007/0264133 A1 | 11/2007 | Schwarz et al. |
| 2008/0016845 A1 | 1/2008 | Zysman et al. |
| 2008/0028763 A1 | 2/2008 | Schwarz et al. |
| 2009/0188234 A1* | 7/2009 | Suciu ................ F02C 7/14 60/262 |
| 2010/0327110 A1 | 12/2010 | Caruel et al. |

FOREIGN PATENT DOCUMENTS

| | | |
|---|---|---|
| WO | 2005005810 A1 | 1/2005 |
| WO | 2012037988 A1 | 3/2012 |

OTHER PUBLICATIONS

The International Search Report dated Mar. 18, 2013 for International Application No. PCT/US13/23645.

The European Search report dated Jan. 14, 2016 for European Application No. 13873259.9.

* cited by examiner

FIG. 4

GAS TURBINE ENGINE WITH LOWER BIFURCATION HEAT EXCHANGER

BACKGROUND

The present invention relates to gas turbine engines, and in particular, to heat exchangers for use in gas turbine engines. Gas turbine engines typically include a number of components that use lubricating oil to cool and lubricate moving parts. Such gas turbine engines typically include one or more heat exchangers for cooling the oil used to cool and lubricate the moving parts.

Some such heat exchangers are air-oil heat exchangers, whereby heat from the oil is transferred to relatively cool gas, such as air, flowing over the heat exchanger. Those air-oil heat exchangers require a source of air for cooling the oil. Some gas turbine engines draw cooling air from a compressor section, from a fan bypass duct, or from another location. Drawing air from such locations can reduce the power output of the gas turbine engine, and thus, reduce engine efficiency. For example, some gas turbine engines include scoops to draw air from a fan bypass duct to cool the heat exchanger. The size, shape, and location of such scoops can block flow through the fan bypass duct, resulting in reduced engine efficiency.

SUMMARY

According to the present invention, a gas turbine engine includes a nacelle, a lower bifurcation structure, and a heat exchanger. The nacelle extends circumferentially around an engine core and defines a fan bypass duct that is substantially annular between an inner wall and an outer wall. The lower bifurcation structure extends between the inner wall and the outer wall, bifurcating the fan bypass duct. The lower bifurcation structure defines a bifurcation duct extending along a central axis of the lower bifurcation structure. The heat exchanger is positioned in the bifurcation duct.

Another embodiment is a gas turbine engine including a nacelle, a lower bifurcation structure, and a heat exchanger. The nacelle extends circumferentially around an engine core and defines a fan bypass duct that is substantially annular between an inner wall and an outer wall. The lower bifurcation structure extends between the inner wall and the outer wall, bifurcating the fan bypass duct. The lower bifurcation structure defines a bifurcation duct having a duct inlet positioned in the fan bypass duct at a front end of the lower bifurcation structure and has a duct outlet positioned in the fan bypass duct at a rear end of the lower bifurcation structure. The heat exchanger is positioned in the bifurcation duct.

Another embodiment is a method including flowing air along a first flow path through a fan bypass duct defined by a nacelle of a gas turbine engine and flowing air from the fan bypass duct through a heat exchanger positioned in a bifurcation duct extending through a lower bifurcation structure of the fan bypass duct along a second flow path. The nacelle is opened to expose a core of the gas turbine engine such that a first side surface of the fan bypass duct is separated from a second side surface of the fan bypass duct.

DETAILED DESCRIPTION

Figure 1:
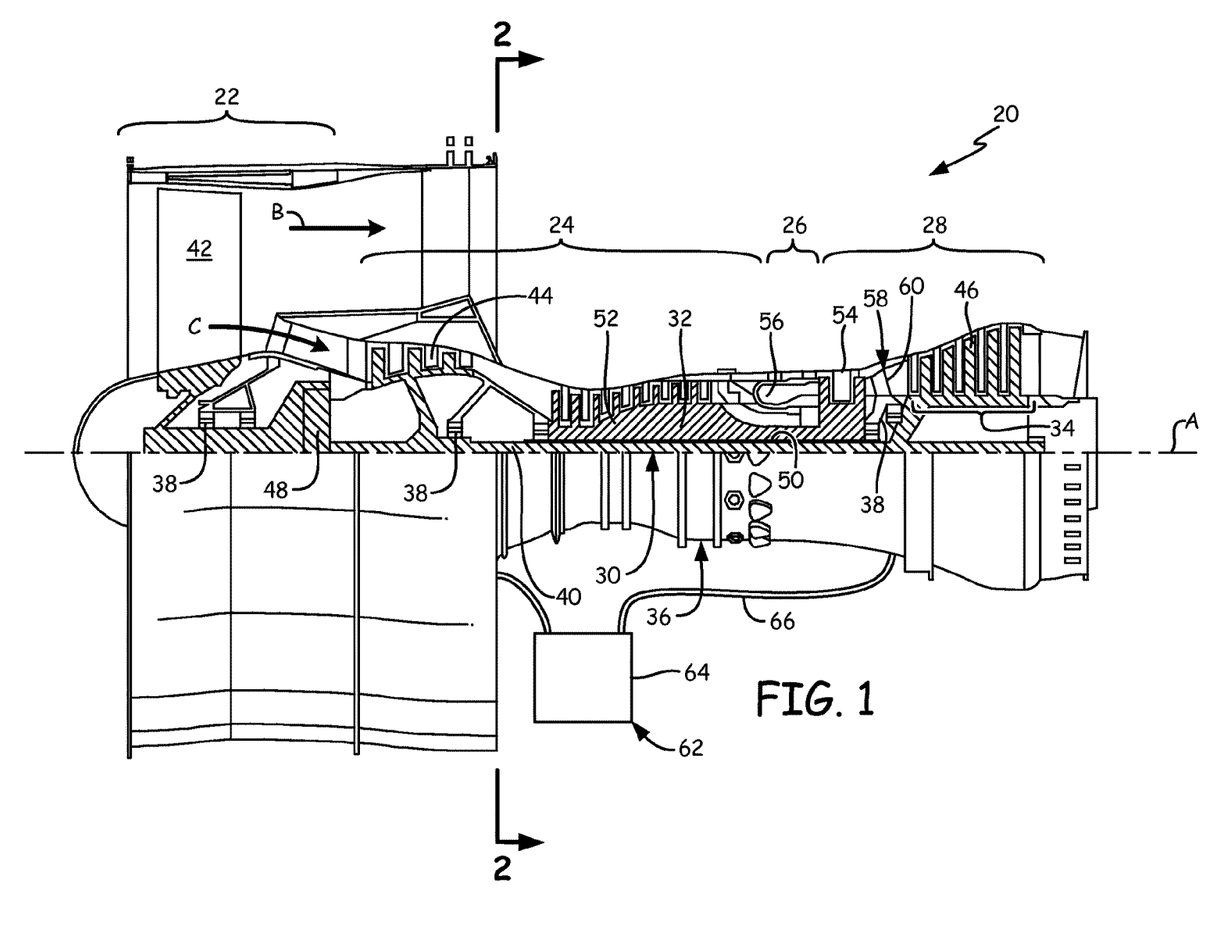
FIG. 1 is a schematic side sectional view of a gas turbine engine with a nacelle and core cowl removed.

FIG. 1 schematically illustrates an example gas turbine engine 20 that includes fan section 22, compressor section 24, combustor section 26 and turbine section 28. Alternative engines might include an augmenter section (not shown) among other systems or features. Fan section 22 drives air along bypass flow path B while compressor section 24 draws air in along core flow path C where air is compressed and communicated to combustor section 26. In combustor section 26, air is mixed with fuel and ignited to generate a high pressure exhaust gas stream that expands through turbine section 28 where energy is extracted and utilized to drive fan section 22 and compressor section 24. Compressor section 24, combustor section 26, and turbine section 28 are defined as a core of gas turbine engine 20.

Although the disclosed non-limiting embodiment depicts one gas turbine engine, it should be understood that the concepts described herein are not limited to use with the illustrated gas turbine engine as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes low speed spool 30 and high speed spool 32 mounted for rotation about an engine central longitudinal axis A relative to an engine static structure 36 via several bearing systems 38. It should be understood that various bearing systems 38 at various locations may alternatively or additionally be provided.

Low speed spool 30 generally includes inner shaft 40 that connects fan 42 and low pressure (or first) compressor section 44 to low pressure (or first) turbine section 46. Inner shaft 40 drives fan 42 through a speed change device, such as geared architecture 48, to drive fan 42 at a lower speed than low speed spool 30. High-speed spool 32 includes outer shaft 50 that interconnects high pressure (or second) compressor section 52 and high pressure (or second) turbine section 54. Inner shaft 40 and outer shaft 50 are concentric and rotate via bearing systems 38 about engine central longitudinal axis A.

Combustor 56 is arranged between high pressure compressor 52 and high pressure turbine 54. In one example, high pressure turbine 54 includes at least two stages to provide a double stage high pressure turbine 54. In another example, high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of low pressure turbine 46 as related to the pressure measured at the outlet of low pressure turbine 46 prior to an exhaust nozzle.

Mid-turbine frame 58 of engine static structure 36 is arranged generally between high pressure turbine 54 and low pressure turbine 46. Mid-turbine frame 58 further supports bearing systems 38 in turbine section 28 as well as setting airflow entering low pressure turbine 46.

The core airflow C is compressed by low pressure compressor 44 then by high pressure compressor 52, mixed with fuel and ignited in combustor 56 to produce high speed exhaust gases that are then expanded through high pressure turbine 54 and low pressure turbine 46. Mid-turbine frame 58 includes vanes 60, which are in the core airflow path and function as an inlet guide vane for low pressure turbine 46. Utilizing vane 60 of mid-turbine frame 58 as the inlet guide vane for low pressure turbine 46 decreases the length of low pressure turbine 46 without increasing the axial length of mid-turbine frame 58. Reducing or eliminating the number of vanes in low pressure turbine 46 shortens the axial length of turbine section 28. Thus, the compactness of gas turbine engine 20 is increased and a higher power density may be achieved.

The disclosed gas turbine engine 20 in one example is a high-bypass geared aircraft engine. In a further example, gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, gas turbine engine 20 includes a bypass ratio greater than about ten (10:1) and the fan diameter is significantly larger than an outer diameter of low pressure compressor 44. It should be understood, however, that the above parameters are only exemplary of one embodiment of a gas turbine engine including a geared architecture and that the present disclosure is applicable to other gas turbine engines.

A significant amount of thrust is provided by bypass flow B due to the high bypass ratio. Fan section 22 of engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram °R)/518.7]^{0.5}$. The "Low corrected fan tip speed", as disclosed herein according to one non-limiting embodiment, is less than about 1150 ft/second.

The example gas turbine engine includes fan 42 that comprises in one non-limiting embodiment less than about twenty-six (26) fan blades. In another non-limiting embodiment, fan section 22 includes less than about twenty (20) fan blades. Moreover, in one disclosed embodiment low pressure turbine 46 includes no more than about six (6) turbine rotors schematically indicated at 34. In another non-limiting example embodiment low pressure turbine 46 includes about three (3) turbine rotors. A ratio between number of fan blades 42 and the number of low pressure turbine rotors is between about 3.3 and about 8.6. The example low pressure turbine 46 provides the driving power to rotate fan section 22 and therefore the relationship between the number of turbine rotors 34 in low pressure turbine 46 and number of blades 42 in fan section 22 disclose an example gas turbine engine 20 with increased power transfer efficiency.

Gas turbine engine 20 can further include lubrication system 62 for supplying lubricating oil to cool and lubricate various components of gas turbine engine 20, such as bearing systems 38 and geared architecture 48. Lubrication system 62 includes heat exchanger 64 and pipes 66. Heat exchanger 64 is positioned at a bottom of gas turbine engine 20. Heat exchanger 64 is an air-oil heat exchanger for cooling the lubricating oil in lubrication system 62 via air from bypass flow path B. Heat exchanger 64 includes passages (not shown) for flowing air therethrough. Heat exchanger 64 also includes passages (not shown) for flowing lubricating oil therethrough, fluidically separate from the air. Lubrication system 62 can include additional components (not shown) such as one or more pumps, filters, tanks, sensors, and/or additional heat exchangers (not shown).

Gas turbine engine 20 can include a nacelle (shown in FIG. 2), which has been opened and removed from FIG. 1 for clarity. Gas turbine engine 20 can include a number of other components which have also been omitted from FIG. 1 for clarity.

Figure 2:
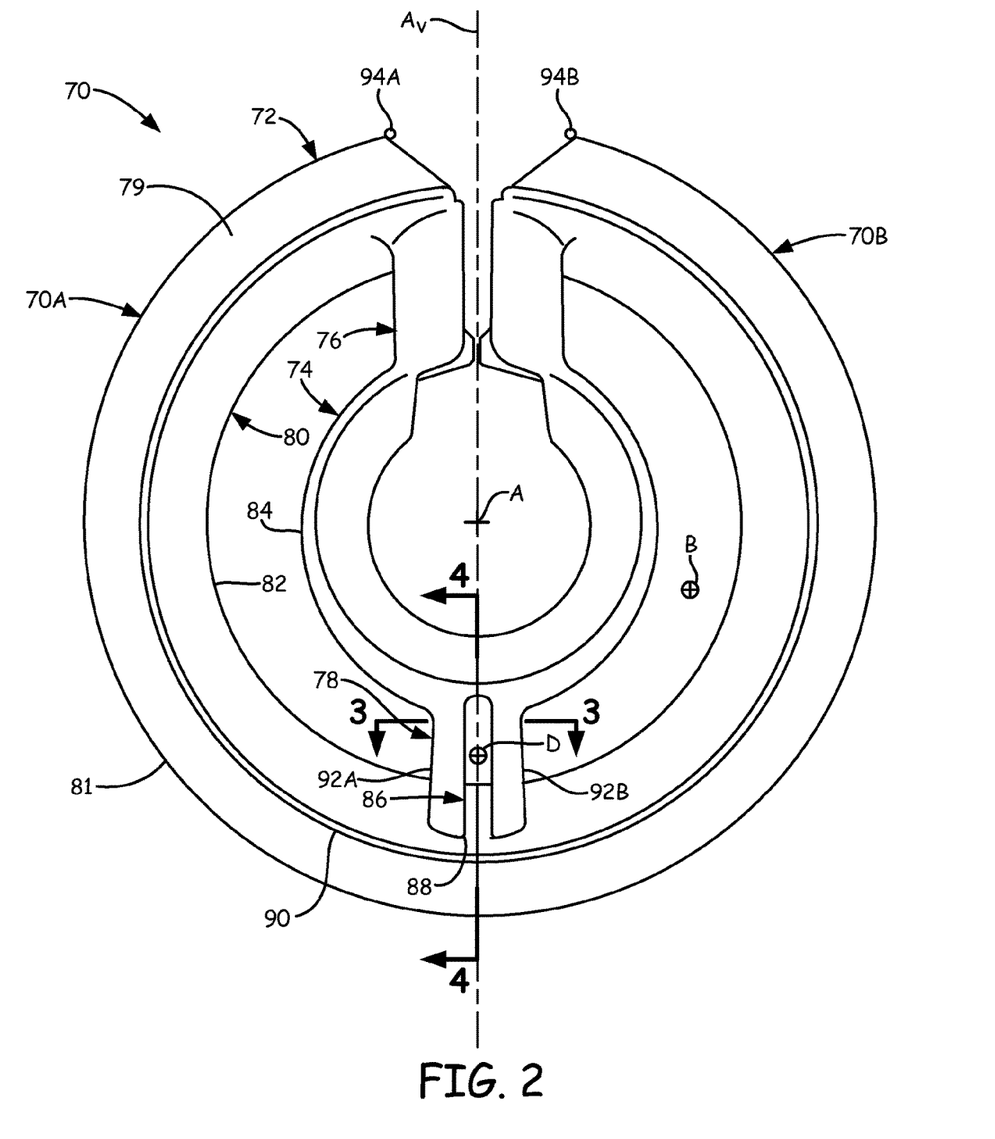
FIG. 2 is a schematic front sectional view of the nacelle of the gas turbine engine taken along line 2-2 of FIG. 1.

FIG. 2 is a schematic front sectional view of nacelle 70 of gas turbine engine 20 (shown in FIG. 1) taken along line 2-2 of FIG. 1. Nacelle 70 includes outer cowl 72, core cowl 74, upper bifurcation structure 76, and lower bifurcation structure 78. Outer cowl 72 can include multiple sections, including a fan cowl section (not shown) and translating cowl section 79 positioned downstream of the fan cowl section. The fan cowl section, which is positioned radially outward of and covers fan section 22 and fan 42 (both shown in FIG. 1), is not shown in FIG. 2 because it is positioned axially forward of section line 2-2 of FIG. 1. Translating cowl section 79, which is positioned axially aft of section line 2-2 of FIG. 1, can include thrust reversers (not shown) for reversing thrust of gas turbine engine 20. In alternative embodiments, outer cowl 72 can have an alternative construction without a translating cowl section.

Core cowl 74 is positioned radially inward of outer cowl 72, and is positioned radially outward of and covers compressor section 24, combustor section 26, and turbine section 28 (all shown in FIG. 1). Outer cowl 72 is connected to core cowl 74 via upper bifurcation structure 76 and lower bifurcation structure 78. Outer cowl 72 and core cowl 74 extend substantially circumferentially with respect to engine central longitudinal axis A. Upper bifurcation structure 76 and lower bifurcation structure 78 extend substantially radially with respect to engine central longitudinal axis A.

Nacelle 70 defines fan bypass duct 80 between outer cowl 72 and core cowl 74. Fan bypass duct 80 is a substantially annular duct that is bifurcated by upper bifurcation structure 76 and lower bifurcation structure 78. Outer wall 82 of fan bypass duct 80 is defined by outer cowl 72. Inner wall 84 of fan bypass duct 80 is defined by core cowl 74. Fan bypass duct 80 defines bypass flow path B between outer wall 82 and inner wall 84. Outer cowl 72 defines outer surface 81 of nacelle 70.

Lower bifurcation structure 78 extends between outer wall 82 and inner wall 84 and defines lower bifurcation duct 86. Lower bifurcation duct 86 has bifurcation duct inlet 88 positioned at a front end of lower bifurcation structure 78, in fan bypass duct 80 aft of translating cowl inlet 90. Lower bifurcation duct 86 extends aft from bifurcation duct inlet 88 between first and second bifurcation side surfaces 92A and 92B. When nacelle 70 is installed on gas turbine engine 20 (shown in FIG. 1), heat exchanger 64 (shown in FIG. 1) is positioned in lower bifurcation duct 86 at a bottom of gas turbine engine 20. Air flowing in fan bypass duct 80 can flow into bifurcation duct inlet 88 and then through heat exchanger 64 along bifurcation duct flowpath D to cool lubricating liquid in heat exchanger 64.

Nacelle 70 is split down engine vertical axis $A_V$ to divide first nacelle side 70A from second nacelle side 70B. Second nacelle side 70B is opposite of and substantially symmetrical to first nacelle side 70A. Nacelle 70 can be opened by pivoting first nacelle side 70A about upper hinge 94A in a first direction and pivoting second nacelle side 70B about upper hinge 94B in a second direction so as to expose gas turbine engine 20. When first and second nacelle sides 70A and 70B are pivoted outward, first side surface 92A is separated from second side surface 92B to expose heat exchanger 64 (shown in FIG. 1). Heat exchanger 64 can remain positioned at a bottom of gas turbine engine 20 when first and second nacelle sides 70A and 70B are pivoted outward.

Figure 3:
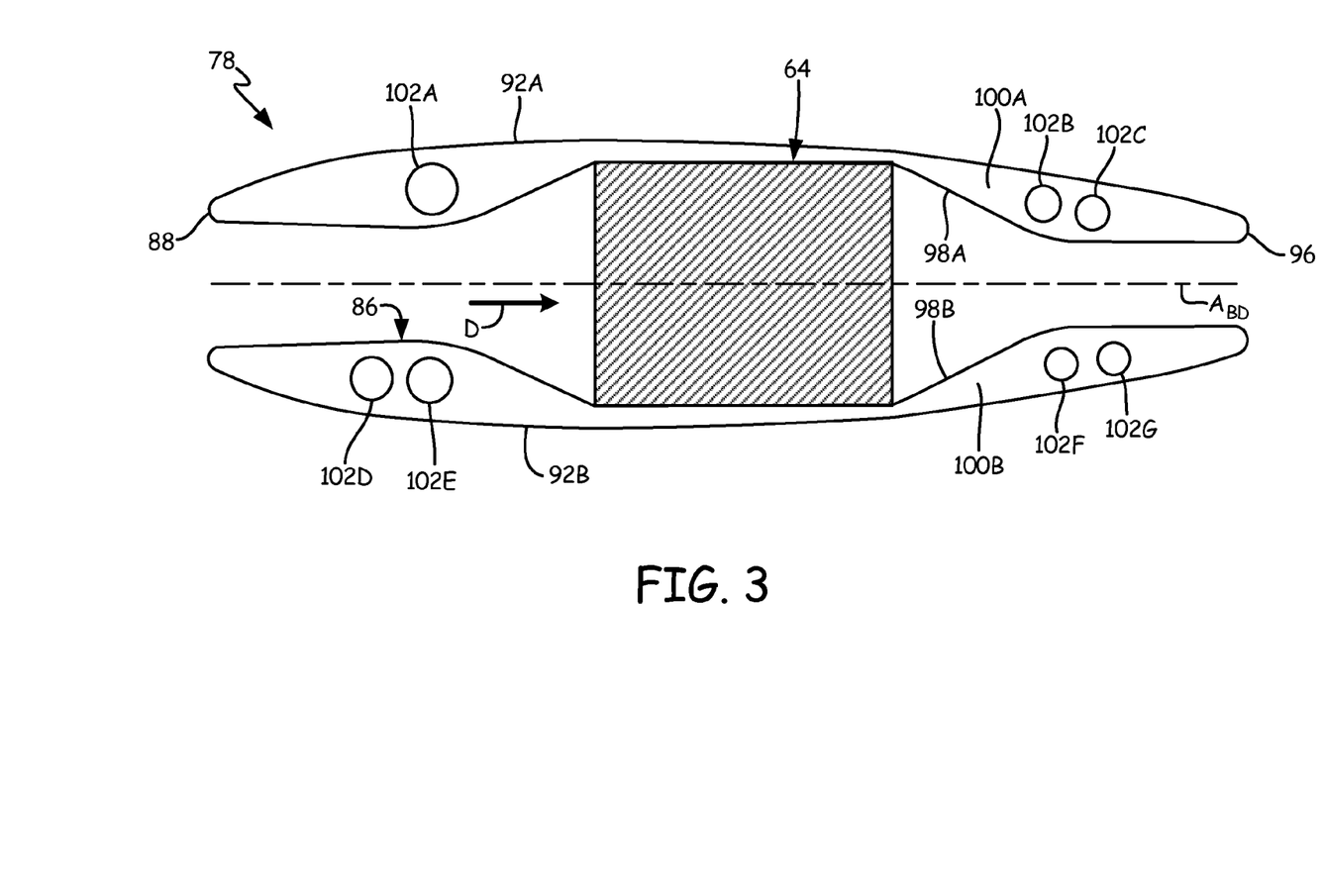
FIG. 3 is top sectional view of a lower bifurcation structure of the nacelle taken along line 3-3 of FIG. 2.

FIG. 3 is a top sectional view of lower bifurcation structure 78 taken along line 3-3 of FIG. 2. FIG. 3 shows lower bifurcation duct 86 extending along central bifurcation duct axis $A_{BD}$ from bifurcation duct inlet 88 to bifurcation duct outlet 96. Bifurcation duct outlet 96 is positioned at a rear end of lower bifurcation structure 78 in fan bypass duct 80. Lower bifurcation duct 86 is substantially defined between first and second bifurcation duct walls 98A and 98B. Lower bifurcation structure 78 is substantially symmetric about axis $A_{BD}$.

Heat exchanger 64 is axially positioned in lower bifurcation duct 86 between bifurcation duct inlet 88 and bifurcation duct outlet 96. Heat exchanger 64 is circumferentially positioned between first and second bifurcation duct walls 98A and 98B. Heat exchanger 64 has a substantially rectangular top profile and is sized to fit in lower bifurcation duct 86. In the illustrated embodiment, heat exchanger 64 is held tightly in place between bifurcation duct walls 98A and 98B so as to structurally support heat exchanger 64. Lower bifurcation duct 86 widens at heat exchanger 64, and is narrower at both bifurcation duct inlet 88 and bifurcation duct outlet 96. Lower bifurcation duct 86 is open, allowing flow from bifurcation duct inlet 88 to bifurcation duct outlet 96. In one embodiment, bifurcation duct inlet 88 and bifurcation duct outlet 96 can remain open during substantially all operating conditions.

First side surface 92A and first bifurcation duct wall 98A combine to define first lower bifurcation cavity 100A on a first side of lower bifurcation duct 86. Second side surface 92B and second bifurcation duct wall 98B combine to define second lower bifurcation cavity 100B on a second side of lower bifurcation duct 86. First and second lower bifurcation cavities 100A and 100B are separated from lower bifurcation duct 86 by first and second bifurcation duct walls 98A and 98B, respectively. A plurality of pipes 102A-102C extend through first lower bifurcation cavity 100A and a plurality of pipes 102D-102G extend through second lower bifurcation cavity 100B. Pipes 102A-102G can house fluid or wires for use by one or more systems of gas turbine engine 20. When first and second nacelle sides 70A and 70B (shown in FIG. 2) are opened, first and second side surfaces 92A and 92B can separate to expose heat exchanger 64, first and second bifurcation duct walls 98A and 98B, and pipes 102A-102G. Thus, heat exchanger 64 and some or all of pipes 102A-102G can remain positioned at a bottom of gas turbine engine 20 (shown in FIG. 1) when first and second nacelle sides 70A and 70B are pivoted outward.

Figure 4:
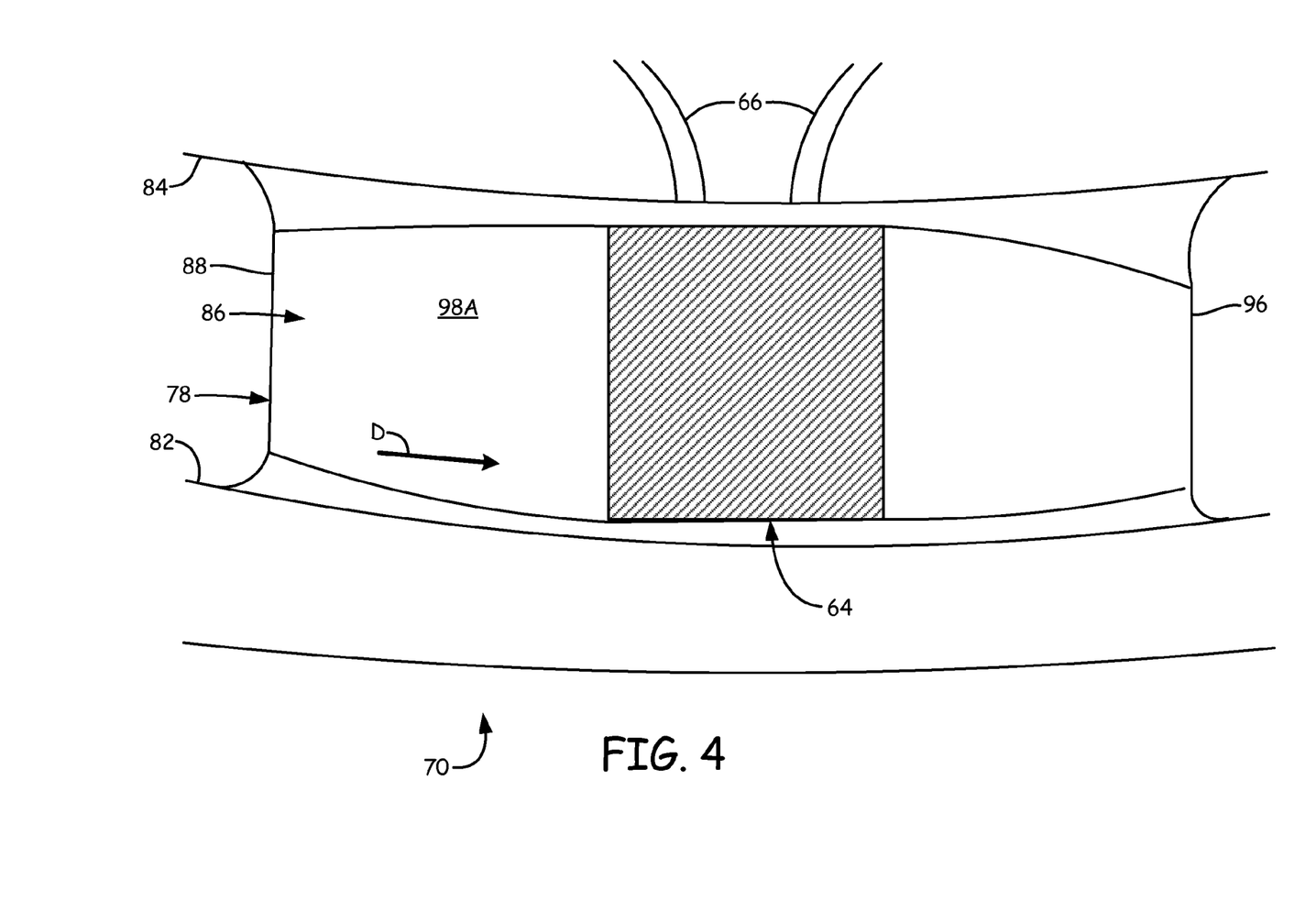
FIG. 4 is a side sectional view of the lower bifurcation structure of the nacelle taken along line 4-4 of FIG. 2.

FIG. 4 is a side sectional view of lower bifurcation structure 78 taken along line 4-4 of FIG. 2. As illustrated in FIG. 4, heat exchanger 64 has a substantially rectangular side profile and is sized to fit in lower bifurcation duct 86. In the illustrated embodiment, heat exchanger 64 is positioned radially with respect to engine central longitudinal axis A (shown in FIGS. 1 and 2) between inner wall 84 and outer wall 82. In an alternative embodiment, lower bifurcation duct 86 can expand radially inward such that a portion of heat exchanger 64 is positioned radially inward of inner wall 84.

Thus, nacelle 70 can include lower bifurcation structure 78, configured as described above. Heat exchanger 64 can be positioned in lower bifurcation duct 86 so as to allow cooling air flowing through fan bypass duct 80 to cool the lubricating oil flowing through heat exchanger 64. Positioning heat exchanger 64 in lower bifurcation structure 78 can allow heat exchanger 64 to be cooled via fan bypass air flow without requiring a separate scoop. Configuring lower bifurcation structure 78 such that lower bifurcation duct 86 extends along central bifurcation duct axis $A_{BD}$, with duct inlet 88 is positioned at a front end of lower bifurcation structure 78 and duct outlet 96 is positioned at a rear end of lower bifurcation structure 78, allows for air to flow relatively efficiently through lower bifurcation duct 86 while blocking less fan bypass air flow as compared to alternative options. Lower bifurcation cavities 100A and 100B can allow for a plurality of pipes 102A-102G to pass through lower bifurcation structure 78, outside of lower bifurcation duct 86. The configuration of lower bifurcation structure 78 can allow first and second nacelle sides 70A and 70B to be pivoted outward, opening nacelle 70, without substantial extra work required due to heat exchanger 64. The above described arrangement can be particularly beneficial in applications where heat exchanger 64 is relatively large, such as gas turbine engines with a geared architecture, such as geared architecture 48, to drive fan 42.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims. For example, lower bifurcation structure 78 and lower bifurcation duct 86 need not be shaped precisely as illustrated, but can be configured as appropriate for the application.

Discussion of Possible Embodiments

The following are non-exclusive descriptions of possible embodiments of the present invention.

A gas turbine engine can include a nacelle, a lower bifurcation structure, and a heat exchanger. The nacelle can extend circumferentially around an engine core and define a fan bypass duct that is substantially annular between an inner wall and an outer wall. The lower bifurcation structure can extend between the inner wall and the outer wall, bifurcating the fan bypass duct. The lower bifurcation structure can define a bifurcation duct extending along a central axis of the lower bifurcation structure. The heat exchanger can be positioned in the bifurcation duct.

The gas turbine engine of the preceding paragraph can optionally include, additionally and/or alternatively any, one or more of the following features, configurations and/or additional components:

the lower bifurcation structure can be substantially symmetric about the central axis;

the heat exchanger can be an air-oil heat exchanger of a lubrication system;

the heat exchanger can have a substantially rectangular side profile and a substantially rectangular top profile;

the lower bifurcation structure can define a first lower bifurcation cavity on a first side of the bifurcation duct and a second lower bifurcation cavity on a second side of the bifurcation duct;

a first pipe can extend through the first lower bifurcation cavity and a second pipe can extend through the second lower bifurcation cavity;

the nacelle can include a first side including a first bifurcation side surface and a second side including a second bifurcation side surface, and the nacelle can be openable such that the first bifurcation side surface is separable from the second bifurcation side surface;

the bifurcation duct can have a duct inlet positioned in the fan bypass duct at a front end of the lower bifurcation structure and a duct outlet positioned in the fan bypass duct at a rear end of the lower bifurcation structure;

the duct inlet can be open during all engine operating conditions; and/or the heat exchanger can be held tightly in place between first and second walls of the bifurcation duct so as to structurally support the heat exchanger.

A gas turbine engine can include a nacelle, a lower bifurcation structure, and a heat exchanger. The nacelle can extend circumferentially around an engine core and define a fan bypass duct that is substantially annular between an inner wall and an outer wall. The lower bifurcation structure can extend between the inner wall and the outer wall, bifurcating the fan bypass duct. The lower bifurcation structure can define a bifurcation duct having a duct inlet positioned in the fan bypass duct at a front end of the lower bifurcation structure and a duct outlet positioned in the fan bypass duct at a rear end of the lower bifurcation structure. The heat exchanger can be positioned in the bifurcation duct.

The gas turbine engine of the preceding paragraph can optionally include, additionally and/or alternatively any, one or more of the following features, configurations and/or additional components:

the heat exchanger can have a substantially rectangular top profile;

the heat exchanger can have a substantially rectangular side profile;

the lower bifurcation structure can define a first lower bifurcation cavity on a first side of the bifurcation duct and a second lower bifurcation cavity on a second side of the bifurcation duct;

a first pipe can extend through the first lower bifurcation cavity, and a second pipe can extend through the second lower bifurcation cavity;

the nacelle can include a first side including a first bifurcation side surface and a second side including a second bifurcation side surface, and the nacelle can be openable such that the first bifurcation side surface is separable from the second bifurcation side surface;

the duct inlet can be open during all engine operating conditions; and/or the heat exchanger can be held tightly in place between first and second walls of the bifurcation duct so as to structurally support the heat exchanger.

A method can include flowing air along a first flow path through a fan bypass duct defined by a nacelle of a gas turbine engine and flowing air from the fan bypass duct through a heat exchanger positioned in a bifurcation duct extending through a lower bifurcation structure of the fan bypass duct along a second flow path. The nacelle can be opened to expose a core of the gas turbine engine such that a first side surface of the fan bypass duct is separated from a second side surface of the fan bypass duct.

The method of the preceding paragraph can optionally include, additionally and/or alternatively any, one or more of the following features, configurations and/or additional steps:

opening the nacelle can include pivoting a first side of the nacelle in a first direction and pivoting a second side of the nacelle in a second direction so as to expose the heat exchanger.

The invention claimed is:

1. A gas turbine engine comprising:
a nacelle extending circumferentially around an engine core and defining a fan bypass duct that is substantially annular between an inner wall and an outer wall;
a lower bifurcation structure extending between the inner wall and the outer wall and bifurcating the fan bypass duct, wherein the lower bifurcation structure comprises a first wall opposite a second wall to form a bifurcation duct extending along a central axis of the lower bifurcation structure between the first wall and the second wall; and
a heat exchanger positioned in the bifurcation duct between the first wall and the second wall of the lower bifurcation structure,
wherein the nacelle comprises a first side comprising a first bifurcation side surface that combines with the first wall of the lower bifurcation structure to form a first cavity between the first bifurcation side surface and the first wall of the lower bifurcation structure,
wherein the nacelle comprises a second side comprising a second bifurcation side surface that combines with the second wall of the lower bifurcation structure to form a second cavity between the second bifurcation side surface and the second wall of the lower bifurcation structure, and
wherein the nacelle is openable such that the first bifurcation side surface is separable from the first wall of the lower bifurcation structure, and the second bifurcation side surface is separable from the second wall of the lower bifurcation structure.

2. The gas turbine engine of claim 1, wherein the lower bifurcation structure is substantially symmetric about the central axis.

3. The gas turbine engine of claim 1, wherein the heat exchanger is an air-oil heat exchanger of a lubrication system.

4. The gas turbine engine of claim 1, wherein the heat exchanger has a substantially rectangular side profile and a substantially rectangular top profile.

5. The gas turbine engine of claim 1, and further comprising:
a first pipe extending through the first cavity; and
a second pipe extending through the second cavity.

6. The gas turbine engine of claim 1, wherein the bifurcation duct has a duct inlet positioned in the fan bypass duct at a front end of the lower bifurcation structure and has a duct outlet positioned in the fan bypass duct at a rear end of the lower bifurcation structure.

7. The gas turbine engine of claim 1, wherein the duct inlet is open during all engine operating conditions.

8. The gas turbine engine of claim 1, wherein the heat exchanger is held tightly in place between first and second walls of the bifurcation duct so as to structurally support the heat exchanger.

9. A gas turbine engine comprising:
a nacelle extending circumferentially around an engine core and defining a fan bypass duct that is substantially annular between an inner wall and an outer wall;
a lower bifurcation structure extending between the inner wall and the outer wall and bifurcating the fan bypass duct, wherein the lower bifurcation structure comprises a first wall opposite a second wall to define a bifurcation duct between the first wall and the second wall and having a duct inlet positioned in the fan bypass duct at a front end of the lower bifurcation structure and has a duct outlet positioned in the fan bypass duct at a rear end of the lower bifurcation structure; and
a heat exchanger positioned in the bifurcation duct between the first wall and the second wall of the lower bifurcation structure,
wherein the nacelle comprises a first side comprising a first bifurcation side surface that combines with the first wall of the lower bifurcation structure to form a first cavity between the first bifurcation side surface and the first wall of the lower bifurcation structure,
wherein the nacelle comprises a second side comprising a second bifurcation side surface that combines with the second wall of the lower bifurcation structure to form a second cavity between the second bifurcation side surface and the second wall of the lower bifurcation structure, and
wherein the nacelle is openable such that the first bifurcation side surface is separable from the first wall of the lower bifurcation structure, and the second bifurcation side surface is separable from the second wall of the lower bifurcation structure.

10. The gas turbine engine of claim 9, wherein the heat exchanger has a substantially rectangular top profile.

11. The gas turbine engine of claim 9, wherein the heat exchanger has a substantially rectangular side profile.

12. The gas turbine engine of claim 9, and further comprising:
a first pipe extending through the first cavity; and
a second pipe extending through the second cavity.

13. The gas turbine engine of claim 9, wherein the duct inlet is open during all engine operating conditions.

14. The gas turbine engine of claim 9, wherein the heat exchanger is held tightly in place between first and second walls of the bifurcation duct so as to structurally support the heat exchanger.

15. A method comprising:
flowing aft along a first flow path through a fan bypass duct defined by a nacelle of a gas turbine engine;
flowing aft from the fan bypass duct along a second flow path through a heat exchanger positioned in a bifurcation duct extending between a first wall and a second wall of a lower bifurcation structure of the fan bypass duct, wherein the nacelle comprises a first side comprising a first bifurcation side surface that combines with the first wall of the lower bifurcation structure to form a first cavity between the first bifurcation side surface and the first wall of the lower bifurcation structure, and wherein the nacelle comprises a second side comprising a second bifurcation side surface that combines with the second wall of the lower bifurcation structure to form a second cavity between the second bifurcation side surface and the second wall of the lower bifurcation structure; and
opening the nacelle to expose a core of the gas turbine engine such that the first bifurcation side surface separates from the first wall and the second bifurcation side surface separates from the second wall.

16. The method of claim 15, wherein opening the nacelle comprises:
pivoting a first side of the nacelle in a first direction and pivoting a second side of the nacelle in a second direction so as to expose the heat exchanger and the first and second walls of the lower bifurcation structure which remain positioned at a bottom of the gas turbine engine.

* * * * *

UNITED STATES PATENT AND TRADEMARK OFFICE
CERTIFICATE OF CORRECTION

PATENT NO. : 10,094,286 B2  
APPLICATION NO. : 14/647844  
DATED : October 9, 2018  
INVENTOR(S) : Matthew J. Forcier Page 1 of 1

It is certified that error appears in the above-identified patent and that said Letters Patent is hereby corrected as shown below:

In the Claims

Column 10, Line 13 Claim 15:  
Delete "aft"  
Insert --air--

Column 10, Line 15 Claim 15:  
Delete "aft"  
Insert --air--

Signed and Sealed this  
Twentieth Day of November, 2018

Andrei Iancu  
*Director of the United States Patent and Trademark Office*